US006618395B1

(12) United States Patent
Kimmitt

(10) Patent No.: US 6,618,395 B1
(45) Date of Patent: Sep. 9, 2003

(54) PHYSICAL CODING SUB-LAYER FOR TRANSMISSION OF DATA OVER MULTI-CHANNEL MEDIA

(75) Inventor: Myles Kimmitt, Shrewsbury, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/321,448

(22) Filed: May 27, 1999

(51) Int. Cl.$^7$ .............................................. H04L 12/26
(52) U.S. Cl. ...................................... 370/473; 370/509
(58) Field of Search ................................ 370/514, 515, 370/364–366, 473, 536; 714/18, 21, 48–52, 700, 701, 703–707, 752–753, 758, 746, 775, 789, 798, 799, 819

(56) References Cited

U.S. PATENT DOCUMENTS

| 4,357,702 A | * 11/1982 | Chase et al. ................. 714/700 |
| 4,445,215 A | * 4/1984 | Svendsen ..................... 370/517 |
| 4,486,739 A | 12/1984 | Franaszek et al. ........... 340/347 |
| 4,593,393 A | 6/1986 | Mead et al. .................. 371/37 |
| 4,791,639 A | * 12/1988 | Afheldt et al. ............... 370/374 |
| 4,864,303 A | * 9/1989 | Ofek ........................... 341/95 |
| 5,084,891 A | * 1/1992 | Ariyavisitakul et al. ..... 714/775 |
| 5,867,601 A | * 2/1999 | Phillips ....................... 382/250 |

OTHER PUBLICATIONS

Yang, "Method and Apparatus for Detecting and Correcting Errors Using Cyclic Redundancy Check", U.S. Publication No. 2002/0046382 A1, Apr. 17, 2002.*

IEEE Draft P802.3ab/D6.0; Supplemenl to: Carrier Sense Multiple Access with Collission Detection (CSMA/CD) Access Method and Physical Layer Specification: Physical Layer Parameters and Specifications for 1000 Mb/s Operation over 4 pair of Category 5 Balanced Copper Cabling, Type 1000BASE–T; Mar. 25, 1999.

* cited by examiner

Primary Examiner—Kwang Bin Yao
Assistant Examiner—Thai D Hoang
(74) Attorney, Agent, or Firm—Weingarten, Schurgin, Gagnebin & Lebovici LLP

(57) ABSTRACT

A method and apparatus for transporting data over a plurality of serial channels. A plurality of parallel data word are generated from a parallel data word of greater width. The plurality of parallel data words are scrambled in a predetermined manner utilizing a side scrambler to generate a plurality of cipher data words. A first bit is generated for each channel as an exclusive OR function from the cipher data word in the respective channel. A second bit is generated for each channel as an exclusive or function of the respective cipher data word and certain control information. The first bit is appended to the cipher data word for the channel from which it was derived. The second bit is appended to the cipher data word for a channel other than the one from which it was derived. The cipher data word and the first and second bits comprise a parallel extended width information word. The extended width information words are serialized and transmitted across a plurality of serial data channels corresponding in number to the number of parallel extended width information words. Receive logic is provided for each serial channel which converts received serial data to parallel data, obtain word synchronization and achieves aligns the words received over the respective channels to assure avoid word skew misalignment across channels. The received data is descrambled and recombined in the receive logic to obtain the originally transmitted data word. Offset side scramblers are designed so as to reduce near end and far end crosstalk.

43 Claims, 6 Drawing Sheets

PHYSICAL CODING SUB-LAYER FOR TRANSMISSION OF DATA OVER MULTI-CHANNEL MEDIA

CROSS REFERENCE TO RELATED APPLICATIONS

N/A

STATEMENT REGARDING FEDERALLY SPONSORED RESEARCH OR DEVELOPMENT

BACKGROUND OF THE INVENTION

The present invention relates generally to data encoding and telecommunications and more specifically, to a physical encoding and decoding sub-layer operative to permit the reliable communication of data across a plurality of serial channels.

In recent years there has been an increasing desire to produce electronic products which operate at ever increasing speeds. Of particular note in this regard are telecommunications devices such as routers, bridges and switches. While typical communication line rates for such devices were 10 megabits per second (mbps) for ethernet transmissions less than a decade ago, 100 mbps ethernet line rates have now become commonplace. Moreover, devices are currently being deployed which support 1 gigabit per second (gbps) ethernet line rates.

Data is typically received at an input port of a telecommunications device over a high speed serial communications link. Received data is converted to a parallel word format in accordance with a specified media access control (MAC) for processing within the device. The width of the parallel data output from the MAC protocol is typically specified for the respective MAC protocol. A 10 gb ethernet protocol has been described having a MAC output in the form of a 64 bit wide data words. At such high data rates, the transport of data within the device can be problematic.

While data can be transported through the device as a parallel word to achieve workable clock rates, such is undesirable for a number of reasons. First, wide bus widths consume substantial space on the printed circuit boards for the numerous conductive paths which are required. Second, passing large numbers of conductive signals through backplanes requires large numbers of connector contacts. Often, it is undesirable to provide for the large number of connector contacts that are required to accommodate a 64 bit wide or greater width parallel bus. Additionally, it is recognized that interconnections through backplane connectors contribute to system unreliability and for this reason as well it is preferable to minimize the number of signal paths through backplanes and connectors. Finally, numerous integrated circuits are required in terms of drivers and receivers to interface to wide parallel buses.

In order to minimize the number of printed circuit board runs and backplane connections, parallel data has been segregated into narrower parallel data words and the respective words have been serialized for transmission over a plurality of serial channels. Complex techniques and/or substantial overhead in terms of signal bandwidth and circuitry have typically been necessary to accomplish synchronization and/or framing in such systems.

Moreover, it is desirable to be able for the receive logic to be able to to acquire synchronization of serially transmitted data "blind"; i.e. without the use of additional synchronization signal line since the transport of separate synchronization signals also adds to the number of printed circuit board runs and connector contacts that are needed.

It would therefore be desirable to have a data coding, decoding and transport technique which allows the transmission of data reliably through a telecommunications device without employing wide parallel buses and which permits blind acquisition of synchronization at the receiver and reassembly of the transmitted data words.

BRIEF SUMMARY OF THE INVENTION

In accordance with the present invention, a method and apparatus for transporting data over a plurality of serial channels is disclosed. A wide parallel data word is subdivided into a plurality of lesser width parallel data words in which the bits from the wide data word are interleaved across the lesser width data words The lesser width data words are each XORed in parallel with the output of a side scrambler to decorrelate the data transmitted within each channel. The outputs of the side scrambler for each channel comprise cipher data which is decorrelated from the remaining channels to reduce near end crosstalk (NEXT) between channels. The cipher data is applied to a cyclic redundancy code (CRC) encoder which, in the present embodiment, generates two additional bits The two additional bits are derived from the cipher data for the respective channels. The first bit is transmitted in the same channel as the cipher data from which it was derived and is used to verify word alignment at the receive end of the respective serial channel. The second bit is used to assure inter-channel skew. The second bit is rotated across the channel, i.e. transmitted in a channel other than one containing the cipher data from which it was derived. Additionally, control information is encoded on the second bit for each of the respective channels. The control information indicates whether the data word ma) contains an idle signal, (b) contains data valid in the low order bytes, (c) contains data valid in the high order byes, or (d) contains valid data across all of the bytes.

The cipher data plus the two additional bits are serialized for each channel and transmitted serially over a serial link or channel. The serial data transmitted over each channel is then deserialized within receive logic at the receive end of the respective serial channel.

At the receive end of the link, logic is provided to permit the acquisition of word frame alignment, to permit acquisition of inter-channel skew alignment and to obtain the proper seed for use by a descrambler associated with each channel so the cipher data can be converted back into the actual data after synchronization has been achieved. The synchronization process involves a number of steps.

First, word frame alignment is achieved within each channel using the first of the two additional bits transmitted over the serial link. Next, the second bit is employed to achieve inter-channel skew alignment. Once inter-channel skew alignment is achieved, the receiver can identify idle symbols transmitted over the respective link from the control information encoded on the second bits of each channel. The idle information is then XORed with the cipher data to acquire the seed for each of the channels. The parallel cipher data is then XORed in the receiver for each channel with the output of the descrambler for the respective channel using the seed acquired for each channel. The output of the descrambler corresponds to the actual data transmitted over the respective serial links prior the scrambling of such data in the transmitter. Finally, the parallel data output for each channel in the receiver is combined to form the original wide parallel data word.

In a preferred embodiment, a primary pseudo-random sequence generator and a secondary pseudo-random number generator is replicated in each of the scramblers and descramblers. To reduce far end crosstalk (FEXT) between receiver and transmitter signals, the transmission of data in one direction over the plurality of channels proceeds using the primary pseudo-random sequence generators and transmission of data in the opposite direction proceeds using the secondary pseudo-random sequence generators in the transmitter scramblers and the receiver descramblers. The primary and secondary pseudo-random sequence generators are selected so as to decorrelate data transmitted by transmitters in opposite directions over the serial channels.

BRIEF DESCRIPTION OF THE SEVERAL VIEWS OF THE DRAWING

The invention will be more fully understood by reference to the following Detailed Description of the Invention in conjunction with the drawing of which.

DETAILED DESCRIPTION OF THE INVENTION

Figure 1:
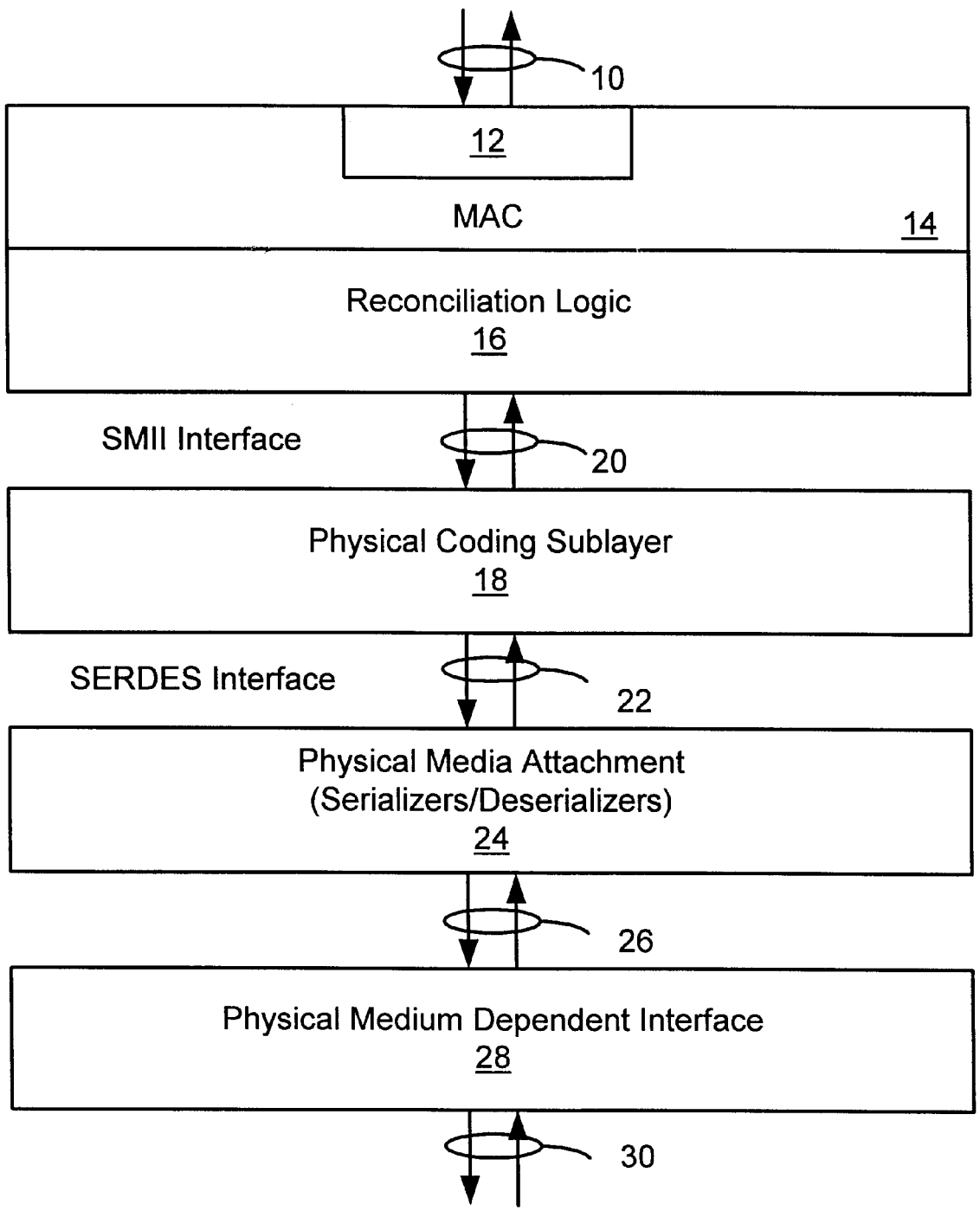
FIG. 1 is a block diagram illustrating a physical coding sublayer within a system operative in accordance with the present invention.

In accordance with the present invention a physical coding sublayer is disclosed which facilitates communication across multiple serial channels in short haul copper links (such as backplanes and short cable connections) and wave division multiplexing (WDM) applications (employing fiber optic media). A system incorporating the presently disclosed physical coding sublayer is illustrated in FIG. 1. Referring to FIG. 1, data is received from a host system interface over a communication link 10 at a system interface 12. The system interface is coupled to media access control (MAC) circuitry 14 and provides the interface between the host system interface and the MAC 14. The MAC 14 controls the reception and transmission of data from and to the physical layer in accordance with techniques well known in the art.

In the embodiment herein described, a physical coding sublayer is illustrated which supports a 10 gigabit per second (gbps) ethernet MAC. It should be noted, however, that the techniques and methods explained herein are scaleable and may be employed to support MACs having different parallel output word widths and different line rates.

Data and control signals provided at the output of the MAC 14 are coupled to reconciliation logic 16. The reconciliation logic 16 is coupled to the physical coding sublayer logic 18 via the scaleable media independent interface (SMII) bus interface 20. The reconciliation logic 16 serves to provide any necessary conversion between the input/output signals associated with the MAC and the signals which make up the SMII bus 20. Data is conveyed between the reconciliation logic 16 and the physical coding sublayer (PCS) 18 via transmit and receive buses, each of which comprises a wide parallel data bus. The physical coding sublayer segments the wide parallel data words received from the reconciliation logic 16 into a plurality of narrower parallel data words and encodes the respective narrower data words as hereinafter described in greater detail to form a corresponding plurality of encoded parallel data words. The encoded parallel data words are conveyed over a Serializer/Deserializer (SERDES) Interface bus 22 from the PCS 18 to a plurality of serializers within Serializer/Deserializer (SERDES) logic 24. The SERDES logic 24 converts the received encoded parallel data words into serial encoded data. A physical attachment bus 26 couples the SERDES logic 24 to the driver logic 28 for the applicable media. More specifically, the physical attachment bus 26 includes a plurality of serial data channels for carrying serialized encoded data from the SERDES logic 24 to the driver logic 28 or, in the reverse direction for carrying serial data from the driver logic 28 to the SERDES logic 24.

The driver logic 28 provides the appropriate electrical or electro-optical interface to a copper or fiber media, as applicable. By subdividing the wide parallel data word into a plurality of narrower parallel data words, encoding the narrower parallel data words and transmitting data contained in the plurality of narrower encoded parallel data words serially over a corresponding plurality data of serial channels, the number of printed circuit board runs are greatly reduced, significant space savings on the printed circuit board may be achieved and fewer connector contacts are needed.

Figure 2:
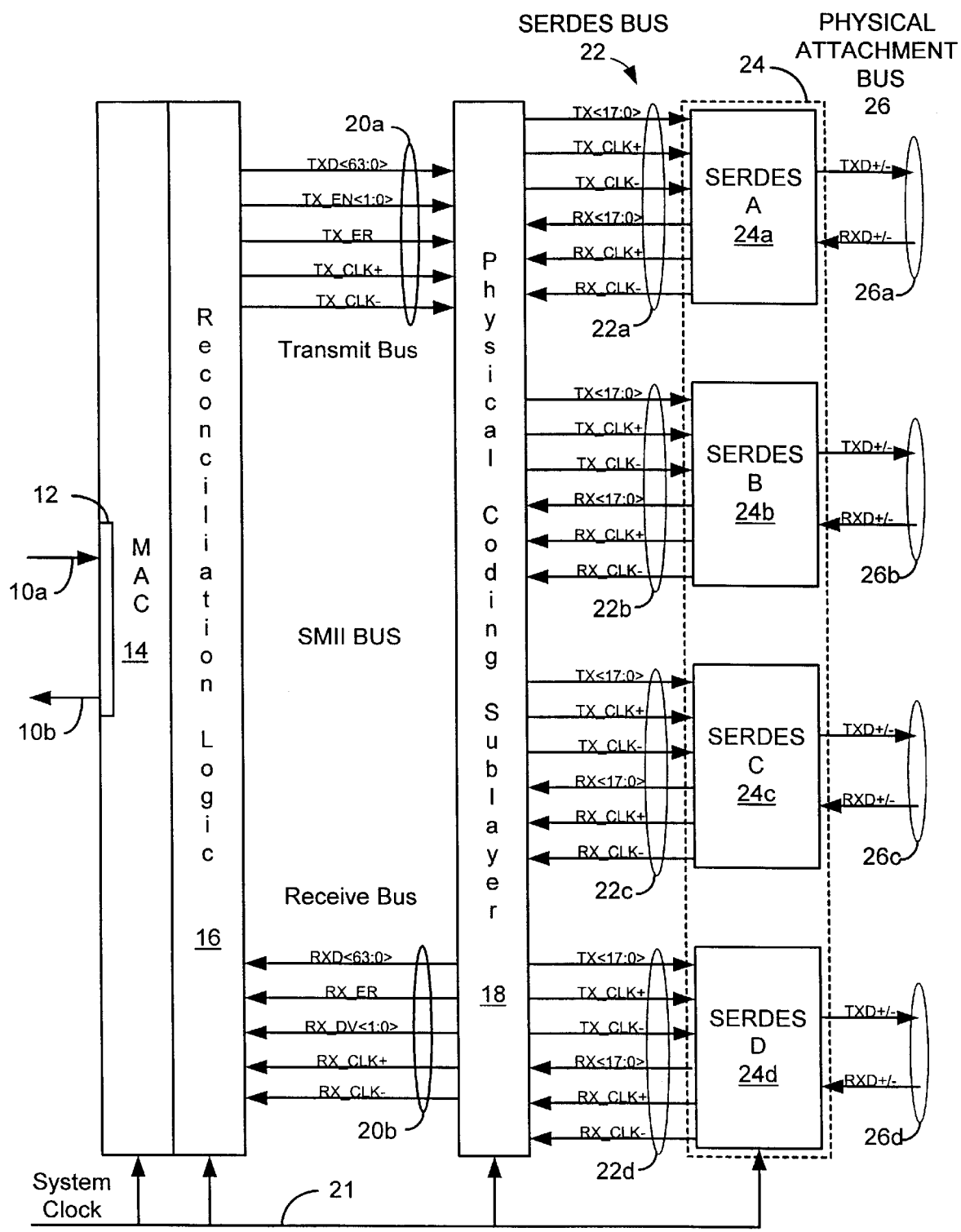
FIG. 2 is a block diagram illustrating bus signals employed in the system depicted in FIG. 1.

FIG. 2 illustrates the scalable media independent interface (SMII) 20, the SERDES interface 22 and the physical attachment interface 26 in greater detail. The SMII bus 20 and the SERDES interface bus 22 each include parallel data buses and control signals. The functions of the respective signals in each of the buses are described below. The physical attachment bus 26, in the illustrated embodiment, includes four channels identified as channels 26a–26d respectively. Each channel includes two differential signalling pairs. One of the differential signalling pairs in each channel is employed for transmission of serial data and the other one of the differential signalling pairs in each channel is employed for reception of serial data.

The Scaleable Media Independent Interface (SMII) bus 20 is used to connect the reconciliation logic 16 with the PCS layer 18. In the illustrated embodiment, the data width of the parallel data word output from the MAC is 64 bits as is the width of the data word output from the reconciliation logic 16. The SMII bus 20 includes control lines (TX_EN<1:0>) which include control information that is employed to identify which bytes are idle characters or contain valid data when the full 64 bits are not valid. The 64-bit bus is the standard width for the 10 GB/s encoding system. Standardization of the SMII bus interface is useful since other 10 GB/s physical interconnect technologies may be developed (such as a full rate optical interface) and accordingly, the physical coding sublayer will be reusable in different interconnect systems.

The SMII bus 20 includes a transmit bus 20a comprising data and control signals driven by the reconciliation logic 16 and destined for the physical coding sublayer 18.

Additionally, the SMII bus 20 includes a receive bus 20b comprising data and control signals driven by the physical coding sublayer 18 and destined for the reconciliation logic 16.

The Transmit Bus

The transmit bus 20a includes sixty four transmit data lines TXD <63:0>, two transmit enable lines TX_EN<1:0>, an optional TX_ER line, and TX_CLK+ and TX_CLK− lines. The functions and use of the respective transmit bus signals are described below.

Transmit Data, TXD<63:0>

The Transmit Data Bus (TXD) is used to transfer transmit data and control from the MAC reconciliation logic 16 to the PCS 18. TXD<63> is defined as the most significant bit and TXD<0> is defined as the least significant bit. Byte order is shown in Table 1 and encoding is shown in Tables 2 through 4.

TABLE 1

Transmit Data Bus Byte Order

| TXD<br><63:56> | TXD<br><55:48> | TXD<br><47:40> | TXD<br><39:32> | TXD<br><31:24> | TXD<br><23:16> | TXD<br><15:8> | TXD<br><7:0> |
|---|---|---|---|---|---|---|---|
| Byte 7 | Byte 6 | Byte 5 | Byte 4 | Byte 3 | Byte 2 | Byte 1 | Byte 0 |

Transmit Enable, TX_EN<1:0>

The Transmit Enable signals indicate the presence of data on the Transmit Data Bus. Two signals are employed to define bytes of valid data in either the upper or lower bytes of the Transmit Data Bus. This is required for Ethernet frames and the inter packet gap since it cannot be assured that valid data will fall on 8-byte boundaries. Four Transmit Enable states are defined: Idle (no data transmission), Data Valid All, Data Valid Low, Data Valid High. Encoding of the Transmit Enable states is shown in Tables 2 through 4.

Transmit Error, TX_ER

Transmit Error is an optional control signal that is used by the MAC reconciliation logic 16 to indicate an error to the receiving MAC with a high degree of confidence. Transmit Error can occur at any time during normal frame transmission (i.e. when Transmit Enable is active) and the PCS is responsible for signaling an error within that frame, although the position of the error within the frame is not defined.

Transmit Clock, TX_CLK<P:N>

TX_CLK is a continuous differential transmit clock, generated by the MAC reconciliation 16, and used to transfer TXD, RX_DV<1:0> and TX_ER to the PCS 18. Sampling occurs on the rising edge of TX_CLK+. This clock is nominally running at 156.25 MHz in a preferred embodiment of the 64-bit wide implementation.

Transmit Signal Encoding

TX_EN<1:0> and TX_ER signals are used to define whether idles are being carried on the transmit data lines TXD<63:0> as shown in Table 2 and which data within the full width data word is valid. In the idle state, the transmit medium is not actively transmitting data. The three data valid states indicate which bytes of data are valid. Three undefined transmit error states are also provided which may be employed for other purposes.

TABLE 2

Transmit Data Bus Control Encoding

| TX_EN 1 | TX_EN 0 | TX_ER | TXD<63:0> | Description |
|---|---|---|---|---|
| 0 | 0 | 0 | 0x5555555555555555 | Idle |
| 0 | 0 | 1 | Reserved | Idle on medium, reserved communication |
| 1 | 1 | 0 | 0x00..00 to 0xFF..FF | Transmit Data Valid All |
| 0 | 1 | 0 | See Table 3 | Transmit Data Valid Low |
| 1 | 0 | 0 | See Table 4 | Transmit Data Valid High |
| 1 | 1 | 1 | Don't Care | Transmit Error |
| 0 | 1 | 1 | Don't Care | Transmit Error |
| 1 | 0 | 1 | Don't Care | Transmit Error |

Further encoding of valid data bytes is contained within the data bus itself during the Data Valid High and Data Valid Low states. These are shown in Tables 3 and Table 4.

TABLE 3

Transmit Data Valid Low Encoding

| TXD<br><63:59> | TXD<br><58> | TXD<br><57> | TXD<br><56> | TXD<br><55:0> | Description |
|---|---|---|---|---|---|
| Reserved | 0 | 0 | 0 | Reserved | Reserved |
| Reserved | 0 | 0 | 1 | Idle*/Data | 1 byte valid, TXD<7:0> |
| Reserved | 0 | 1 | 0 | Idle*/Data | 2 bytes valid, TXD<15:0> |
| Reserved | 0 | 1 | 1 | Idle*/Data | 3 bytes valid, TXD<23:0> |
| Reserved | 1 | 0 | 0 | Idle*/Data | 4 bytes valid, TXD<31:0> |
| Reserved | 1 | 0 | 1 | Idle*/Data | 5 bytes valid, TXD<39:0> |
| Reserved | 1 | 1 | 0 | Idle*/Data | 6 bytes valid, TXD<47:0> |
| Reserved | 1 | 1 | 1 | Idle*/Data | 7 bytes valid, TXD<55:0> |

*Unused TXD bytes are set to 0x55

TABLE 4

Transmit Data Valid High Encoding

| TXD<br><7:3> | TXD<br><2> | TXD<br><1> | TXD<br><0> | TXD<br><55:0> | Description |
|---|---|---|---|---|---|
| Reserved | 0 | 0 | 0 | Reserved | Reserved |
| Reserved | 0 | 0 | 1 | Data/Idle* | 1 byte valid, TXD<63:56> |
| Reserved | 0 | 1 | 0 | Data/Idle* | 2 bytes valid, TXD<63:48> |
| Reserved | 0 | 1 | 1 | Data/Idle* | 3 bytes valid, TXD<63:40> |
| Reserved | 1 | 0 | 0 | Data/Idle* | 4 bytes valid, TXD<63:32> |
| Reserved | 1 | 0 | 1 | Data/Idle* | 5 bytes valid, TXD<63:24> |
| Reserved | 1 | 1 | 0 | Data/Idle* | 6 bytes valid, TXD<63:16> |
| Reserved | 1 | 1 | 1 | Data/Idle* | 7 bytes valid, TXD<63:8> |

*Unused TXD bytes are set to 0x55

The Receive Bus

The receive bus is employed for data forwarding from the physical coding sublayer 18 to the reconciliation logic 16 and includes sixty four receive data lines RXD<63:0>, two RX_DV<0:1> lines, an RX_ER line, and clock lines RX_CLK+ and RX_CLK−. The function of each of the receive bus signal lines is described below.

Receive Data, RXD<63:0>

The Receive Data Bus (RXD<63:0>) is used to transfer receive data and control information from the PCS layer 18 to the MAC reconciliation logic 16. RXD<63> is defined as the most significant bit and RXD<0> is defined as the least significant bit. Byte order is shown in Table 5 and encoding is shown in Tables 6 through 8.

TABLE 5

Receive Data Bus Byte Order

| RXD<br><63:56> | RXD<br><55:48> | RXD<br><47:40> | RXD<br><39:32> | RXD<br><31:24> | RXD<br><23:16> | RXD<br><15:8> | RXD<br><7:0> |
|---|---|---|---|---|---|---|---|
| Byte 7 | Byte 6 | Byte 5 | Byte 4 | Byte 3 | Byte 2 | Byte 1 | Byte 0 |

Receive Data Valid, RX_DV<1:0>

The receive data valid signals RX_DV<1:0> indicate the presence of data on the receive data bus lines RXD<63:0>. The signals RX_DV<1:0> are provided to identify the bytes of valid data on the receive bus RXD<63:0>. This facility is necessary since the length of Ethernet frames and inter-packet gaps do not necessarily fall on 8-byte boundaries. Four receive states are possible: Idle (no data reception), receive data valid all, receive data valid low, receive data valid high. The encoding of Receive Data Valid signals is shown in Tables 6 through 8.

Receive Error, RX_ER

Receive Error RX_ER is used by the PCS layer 18 to signal the MAC reconciliation logic 16 that an error has been detected in the received frame. Receive Error can occur at any time during normal frame reception; i.e. when Receive Data Valid is active and the PCS 18 is responsible for signaling an error within that frame, although the position of the error within the frame is not defined. Use of the Receive Error signal during idle is reserved for in-band communication between the MAC 14 and the PCS layer 18.

Receive Clock, RX_CLK<P:N>

RX_CLK+ and RX_CLK− comprise a continuous differential receive clock, generated by the PCS layer 18, and is used to transfer RXD, RX_DV<1:0> and RX_ER to the MAC reconciliation logic 16. In a preferred embodiment, sampling occurs on the rising edge of RX_CLK+. The clock is nominally running at 156.25 MHz in the illustrated implementation.

The RX clock is derived from the received data streams during normal receive operation using a phase locked loop or any other suitable clock recovery technique. The PCS 18 uses continuous signaling on the medium, i.e. idle characters are transmitted over the receive bus during periods when actual data is not being transmitted. The RX clock is derived from a local reference clock (such as a reference or TX clock) when receive streams are not present. Transitions between the recovered clock and the local reference clock are accomplished by extending either the high or low state of the RX clock.

Receive Signal Encoding

RX_DV<1:0> and RX_ER define primary control of the Receive Data bus as shown in Table 6. An idle state is provided for transmission of idle characters when the receive data bus is not carrying active data. Three data valid states indicate which bytes of receive data are valid. The data valid states are valid when the RX_ER signal is deasserted.

TABLE 6

Receive Data Bus Control Encoding

| RX_DV1 | RX_DV0 | RX_ER | RXD<63:0> | Description |
|---|---|---|---|---|
| 0 | 0 | 0 | 0x5555555555555555 | Idle |
| 0 | 0 | 1 | Reserved | Idle on medium, reserved communication |
| 1 | 1 | 0 | 0x00..00 to 0xFF..FF | Receive Data Valid All |
| 0 | 1 | 0 | See Table 7 | Receive Data Valid Low |
| 1 | 0 | 0 | See Table 8 | Receive Data Valid High |
| 1 | 1 | 1 | Don't Care | Receive Error |
| 0 | 1 | 1 | Don't Care | Receive Error |
| 1 | 0 | 1 | Don't Care | Receive Error |

Further encoding of valid data bytes is contained within the Receive Data bus (RXD data lines) during times when the Data Valid High and Data Valid Low states are active. These are shown in Table 7 and Table 8.

TABLE 7

Receive Data Valid Low Encoding

| RXD<br><63:59> | RXD<br><58> | RXD<br><57> | RXD<br><56> | RXD<br><55:0> | Description |
|---|---|---|---|---|---|
| Reserved | 0 | 0 | 0 | Reserved | Reserved |
| Reserved | 0 | 0 | 1 | Idle*/Data | 1 byte valid, RXD<7:0> |
| Reserved | 0 | 1 | 0 | Idle*/Data | 2 bytes valid, RXD<15:0> |
| Reserved | 0 | 1 | 1 | Idle*/Data | 3 bytes valid, RXD<23:0> |
| Reserved | 1 | 0 | 0 | Idle*/Data | 4 bytes valid, RXD<31:0> |
| Reserved | 1 | 0 | 1 | Idle*/Data | 5 bytes valid, RXD<39:0> |
| Reserved | 1 | 1 | 0 | Idle*/Data | 6 bytes valid, RXD<47:0> |
| Reserved | 1 | 1 | 1 | Idle*/Data | 7 bytes valid, RXD<55:0> |

*Unused RXD bytes are set to 0x55

TABLE 8

Receive Data Valid High Encoding

| RXD<br><7:3> | RXD<br><2> | RXD<br><1> | RXD<br><0> | RXD<br><55:0> | Description |
|---|---|---|---|---|---|
| Reserved | 0 | 0 | 0 | Reserved | Reserved |
| Reserved | 0 | 0 | 1 | Data/Idle* | 1 byte valid, RXD<63:56> |
| Reserved | 0 | 1 | 0 | Data/Idle* | 2 bytes valid, RXD<63:48> |
| Reserved | 0 | 1 | 1 | Data/Idle* | 3 bytes valid, RXD<63:40> |
| Reserved | 1 | 0 | 0 | Data/Idle* | 4 bytes valid, RXD<63:32> |

TABLE 8-continued

Receive Data Valid High Encoding

| RXD <7:3> | RXD <2> | RXD <1> | RXD <0> | RXD <55:0> | Description |
|---|---|---|---|---|---|
| Reserved | 1 | 0 | 1 | Data/Idle* | 5 bytes valid, RXD<63:24> |
| Reserved | 1 | 1 | 0 | Data/Idle* | 6 bytes valid, RXD<63:16> |
| Reserved | 1 | 1 | 1 | Data/Idle* | 7 bytes valid, RXD<63:8> |

*Unused RXD bytes are set to 0x55

As illustrated in FIG. 2, the SERDES interface bus 22 includes four groups of data and control lines 22a–22dd corresponding to data and control signals associated with each of four channels. Each one of the four channels on the SERDES interface includes 18 data lines TX<17:0>, two transmit clock lines TX_CLK+ and TX_CLK−, 18 receive data lines RX<17:0> and two receive clock lines RX_CLK+ and RX_CLK−.

Parallel data received over the transmit buses (TX bus) by the serializers within SERDES logic 24a–24d respectively, is serialized for transmission over the differential serial transmit link (TXD+/−) for the corresponding channel 26a–26d of the physical attachment bus 26. In the present embodiment, each channel 26a–26d includes a differential serial data link TXD+/− for data driven by the respective serializer within the SERDES logic 24 and a serial data link RXD+/− for data destined for the respective deserializer within the SERDES logic 24. While the disclosed embodiment employs differential data and clock signals, single ended drivers and receivers may be employed.

Figure 3:
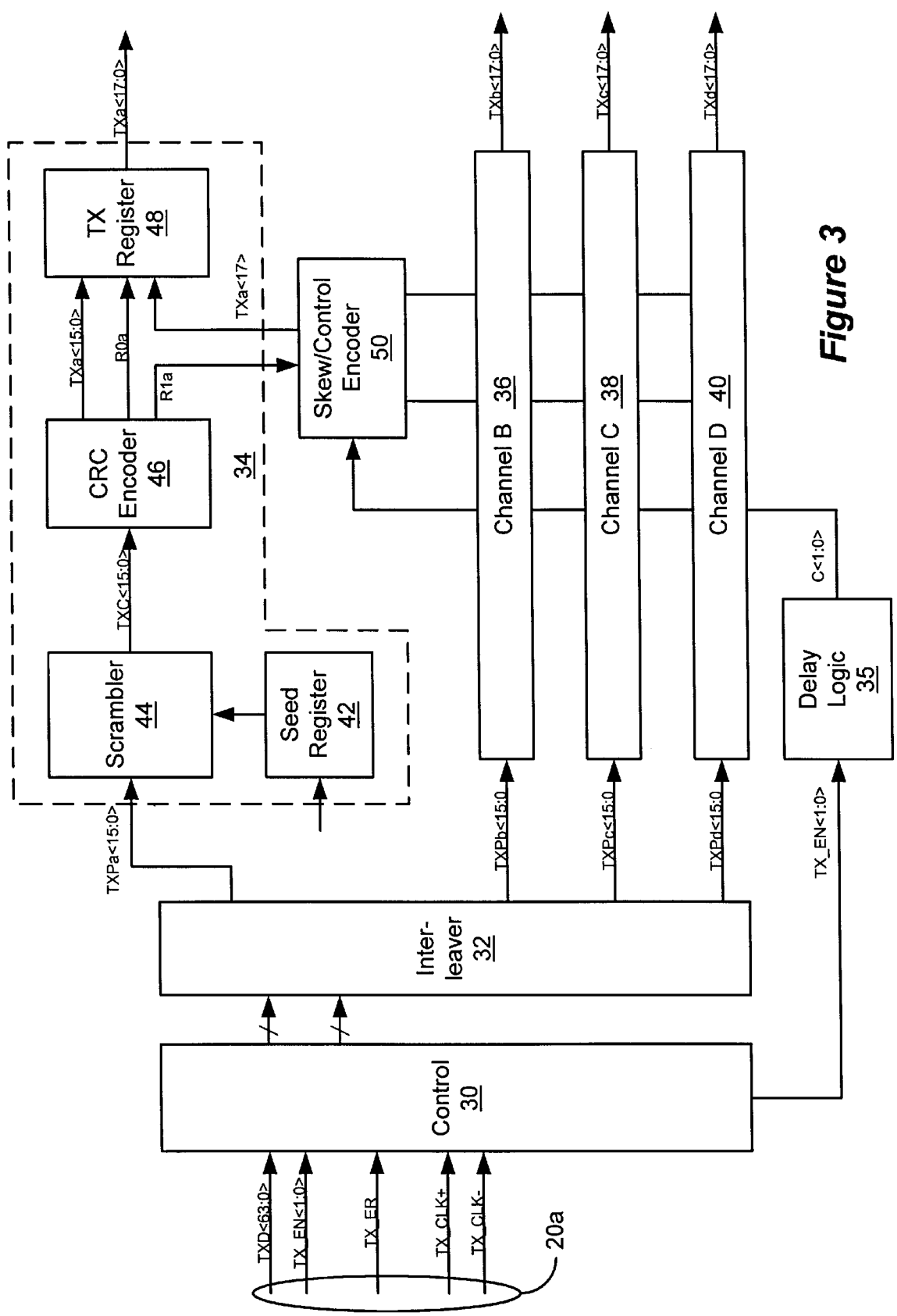
FIG. 3 is a block diagram illustrating the transmit portion of the physical coding sublayer depicted in FIGS. 1 and 2.

The transmit path through the physical coding sublayer 18 is illustrated in greater detail in FIG. 3. The transmit path includes a control block 30 which is operative to decode the SMII transmit state and to control the data path contents during control symbols. Inband communications from the MAC during the inter packet gap may be decoded and separated in the control block.

The transmit interleave logic 32 segments the 64 bit wide data word received from the 10 gbps MAC into four sixteen-bit wide data words. The bits are interleaved into the channels to give better error detection properties to the MAC CRC. More specificically, by interleaving the bits from the 64 bit wide data word across the narrower sixteen bit wide data words such that each successive bit of the wide data word is contained within a different one of the sixteen bit wide data words, burst error on any of the channels will appear as dispersed errors in the MAC data stream. Such increases the probability of error detection. Shown below are the equations which illustrate how the parallel data input within the 64 bit wide parallel data word is interleaved across and segmented into the four sixteen bit data words in the present embodiment.

TXPa<15:0>=<TXD60, TXD56, TXD52, TXD48, TXD44, TXD40, TXD36, TXD32, TXD28, TXD24, TXD20, TXD16, TXD12, TXD8, TXD4, TXD0>
TXPb<15:0>=<TXD61, TXD57, TXD53, TXD49, TXD45, TXD41, TXD37, TXD33, TXD29, TXD25, TXD21, TXD17, TXD13, TXD9, TXD5, TXD1>
TXPc<15:0>=<TXD62, TXD58, TXD54, TXD50, TXD46, TXD42, TXD38, TXD34, TXD30, TXD26, TXD22, TXD18, TXD14, TXD10, TXD6, TXD2>
TXPd<15:0>=<TXD63, TXD59, TXD55, TXD51, TXD47, TXD43, TXD39, TXD35, TXD31, TXD27, TXD23, TXD19, TXD15, TXD11, TXD7, TXD3>

The output from the interleave logic 32 thus comprises four 16 bit parallel data words which are coupled to channel logic 34, 36, 38, 40 via buses TXPa through TXPd. The channel logic for each of the four channels includes scrambler logic 44, CRC encoder logic 46 and a transmit register 48. While the channel logic is depicted in FIG. 3 only for channel A for ease of illustration, the same logic is replicated in the remaining channels.

Scrambler Operation

The side scrambler 44 is operative to provide direct current (DC) balance, provide clock transitions to allow clock recovery at the receiver, and to spread the signal spectrum across the available bandwidth and minimize electro-magnetic interference (EMI). The incoming data to the scrambler logic 44 is carried on the respective TXP bus and is driven by the transmit interleave logic 32. The incoming data received over the TXP bus is XORED with a sixteen bit wide output from a pseudo-random binary sequence generator as hereinafter discussed in greater detail.

Each of the channels 34, 36, 38, 40 has a separate side scrambler 44, which is generating the same binary sequence. The sequence generated in each channel, however, is offset in time, so that channels are de-correlated locally in time. In a preferred embodiment, decorrelation is achieved over +/−2.9 us, using a pseudo-random binary sequence (PRBS15 sequence), which serves to de-correlate Near End Crosstalk (NEXT) and Far End Crosstalk (FEXT) contributions from other channels. The time offset of the sequences in the respective channels is achieved by loading different seeds in each channel at startup. Separate side scramblers for each channel provide the benefit of keeping global interconnects low while providing a more scalable architecture. Alternatively, a centralized scrambler may be employed.

The channel logic also includes CRC Encoder logic 46 which is employed to generate two bits from the side scrambler 44 output. The two bits generated by the CRC encoder logic are used by the receive logic to acquire word alignment and inter-channel skew alignment as hereinafter discussed.

In the present embodiment, a pseudo random binary sequence of length 15 was chosen to allow receiver synchronization within one Idle transmission period. Data in each channel is defined to be constant at either 0x00 or 0xFF during an Idle transmission so the 15 bit seed can be recovered completely within a 16-bit word.

Two PRBS15 sequences are employed which are referred to herein as the primary and secondary sequences. The receiver waveform can be de-correlated from the transmitter NEXT if the transmit logic at both ends of the link are using different pseudo-random sequences. The selection of the sequence to be employed at each end of the link may be accomplished in a number of ways. The primary and secondary sequences may be established out of band via a hub. Alternatively, transmission in one direction may be established first using one of the sequences and transmission then established in the opposing direction using the other one of the sequences.

The two generator polynomials used for the primary and secondary PRBS15 sequences are:

$G_P(x)=1+x^{14}+x^{15}$     (Primary generator)

$G_S(x)=1+x^{11}+x^{15}$     (Secondary generator)

Figure 4:
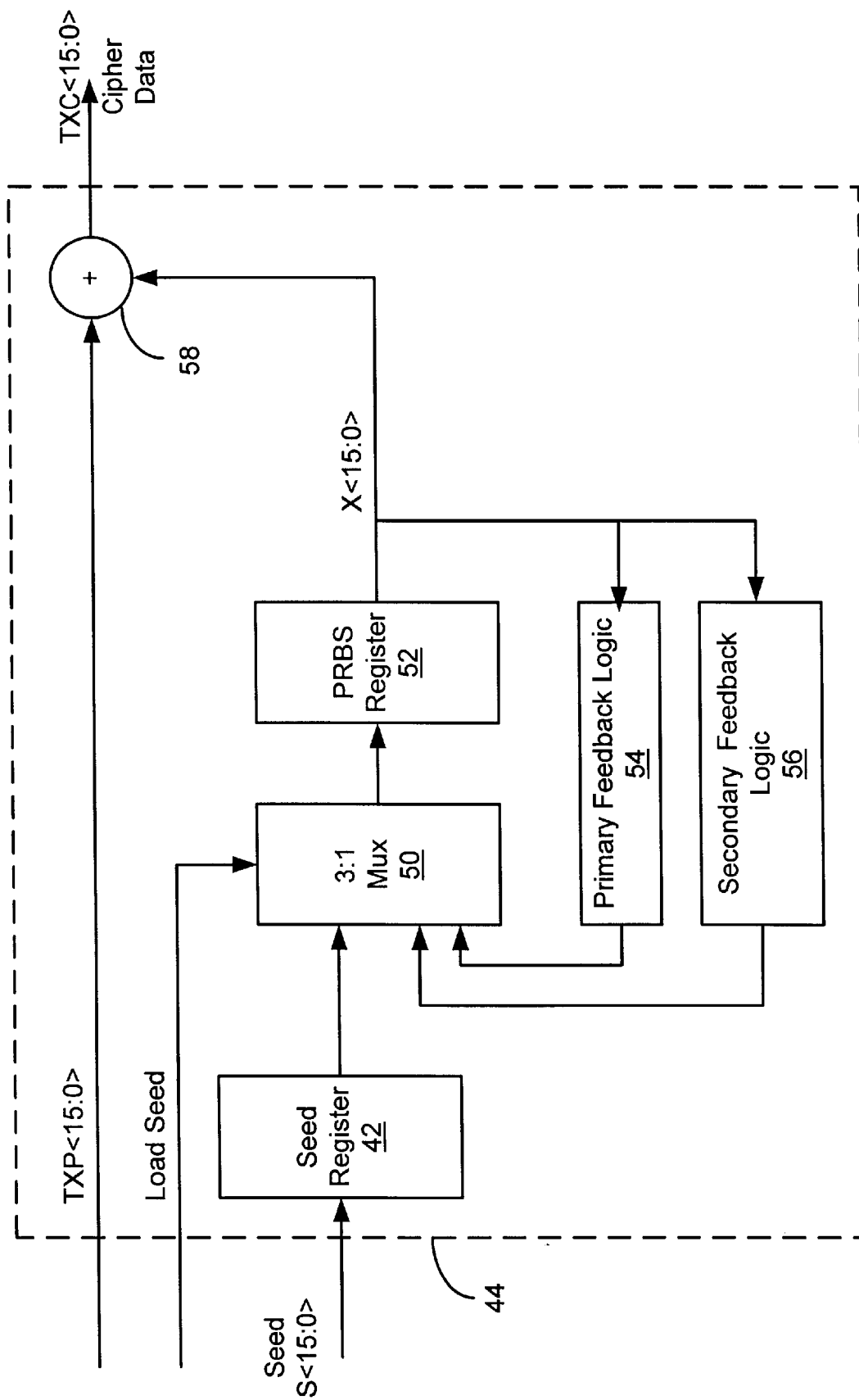
FIG. 4 is a block diagram of a side scrambler for scrambling data in each channel of the transmit portion of the physical coding sublayer.

These sequences have known linear feedback shift register (LFSR) implementations. The high speed and parallel nature of the PCS 18 employs a 16-bit parallel implementation so as to be able to generate 16 bits per cycle which may be XORed with the incoming data received over the TXP bus. The Side Scrambler 44 is depicted in greater detail in FIG. 4.

The feedback equations describing the primary feedback logic 54 are shown below.

XPnext0=X1+X2;
XPnext1=X2+X3;
XPnext2=X3+X4;
XPnext3=X4+X5;
XPnext4=X5+X6;
XPnext5=X6+X7;
XPnext6=X7+X8;
XPnext7=X8+X9;
XPnext8=X9+X10;
XPnext9=X10+X11;
XPnext10=X11+X12;
XPnext11=X12+X13;
XPnext12=X13+X14;
XPnext13=X0+X1 +X14;
XPnext14=X0+X2;
XPnext15=X1+X3;

The "+" signs in the above identified equations indicate exclusive or operations.

The 15 bit primary seeds to start up a four-channel transmitter up are as follows:

$S_A$=0x7FFF (M(0))
$S_B$=0x7F00 (M(½))
$S_C$=0x70FF (M(¼))
$S_D$=0x780F (M(¾))

To provide the full sixteen bit seed during the initial cycle, the following 16 bit seeds may be employed.

$S_A$=0x7FFF (M(0))
$S_B$=0x7F00 (M(½))
$S_C$=0x70FF (M(½))
$S_D$=0x780F (M(¾))

Where M(x) denotes the relative starting position in the maximum length sequence.

Similarly, the feedback equations for the secondary sequence are as shown below.

XSnext0=X1+X5;
XSnext1=X2+X6;
XSnext2=X3+X7;
XSnext3=X4+X8;
XSnext4=X5+X9;
XSnext5=X6+X10;
XSnext6=X7+X11;
XSnext7=X8+X12;
XSnext8=X9+X13;
XSnext9=X10+X14;
XSnext10=X0+X4+X11;
XSnext11=X1+X5+X12;
XSnext12=X2+X6+X13;
XSnext13=X3+X7+X14;
XSnext14=X0+X8;
XSnext15=X1+X9;

The 15 bit secondary seeds to start up a four-channel transmitter are as follows:

$S_A$=0x7FFF (M(0))
$S_B$=0x00CC (M(½))
$S_C$=0x0AAA (M(¼))
$S_D$=0x0008 (M(¾))

To provide the full sixteen bit seed during the initial cycle, the following seed values may be employed:

$S_A$=0x7FFF (M(0))
$S_B$=0x00CC (M(½))
$S_C$=0x0AAA (M(¼))
$S_D$=0x0008 (M(¾))

Where M(x) denotes the relative starting position in the maximum length sequence. It should be appreciated that other suitable starting seeds may be employed for both the primary and the secondary pseudo-random sequence generators.

The scrambler is described below with respect to the use of the primary seed and primary feedback logic. Operation is the same when utilizing the secondary with the secondary feedback logic noting that the starting seed values differ for the respective channels and the feedback equations differ so that de-correlation is maintained to minimize Far End Crosstalk on the serial data channels.

The bit seed value for the respective channel is stored within the seed register 42 at startup. In a preferred embodiment, one seed register 42 is provided for each one of the side scramblers and a different seed value ($S_A$, $S_B$, $S_C$, $S_D$) is stored within each one of the registers. The seed value is passed through a multiplexer 52 and stored within a pseudo-random binary sequence (PRBS) register 52. The output of the PRBS Register 52 on the bus X<15:0> is exclusive or'd (XORed) with the 16 bit parallel data received over the TXP bus (TXP<15:0) by XOR gates 58 to generate cipher data on the TXC bus (TXC<15:0). It is noted that during the first cycle, if only a fifteen bit seed is employed, the output from the PRBS Register 52 may or may not be valid. Since the primary and secondary logic 54, 56 generates the next sixteen bit pseudo-random sequence values based upon the low order fifteen bits from the PRBS Register 52, after the first cycle, the correct sequence value is stored within the PRBS Register. Alternatively, a sixteen bit seed value may be stored within the seed register 42 for each channel so that the correct output within the pseudo-random binary sequence is obtained during the initial cycle as well as all subsequent cycles.

The output of the PRBS Register 52 is applied to the inputs of the primary feedback logic 52 and the secondary feedback logic 56. The outputs the primary feedback logic 54 and the secondary feedback logic 56 are coupled to inputs of the multiplexer 50. Assuming again that the primary feedback logic is being employed, the primary feedback logic generates the next 16 bit pseudo-random binary sequence which is clocked into the PRBS Register 52 via the mulitplexer 50. The new pseudo-random binary sequence stored within the PRBS Register 52 is coupled to the XOR gates 58 via bus X<15:0> and is XORed with the next data word received over the TXP bus (TXP<15:0>) to produce the next 16 bit parallel word of encoded cipher data. This process is repeated for each subsequent word on the TXP bus. As illustrated in FIG. 3, The cipher data output from the Scrambler 44 is coupled to CRC encoder logic 46 via the TXC bus. The bits corresponding to TXC<15:0> are passed unchanged to the TX register 48 TXa bus over lines TXa<15:0> in the Channel A logic 34.

CRC Block Encoder

The CRC Block Encoder 46 generates two bits, R0 and R1, from the 16-bit scrambled word received from the scrambler 44. The R0 bit for Channel A is designated R0*a* and the R1 bit for Channel A is designated as R1a as illustrated in FIG. 3. The bits for the remaining channels (not shown) are designated in a similar manner reflecting their channel association. The two bits are generated using a CRC algorithm. The R0 bit is added directly to the channel data stream as TX15 and is employed by the receive logic to obtain word alignment. The R1 bit is further encoded with control information and is transmitted in a channel other than the one containing the cipher data from which it was derived. Skew alignment and data valid information are decoded from the R1 bits received by the channel reaceive and control logic. More specifically, the R1 bits are encoded with Data Valid information corresponding to the TX_EN<1:0> signals as hereinsfter described. The R0 bit is a function of the 16-bit input word, so the receiver can search for R0 in the recovered stream to obtain correct 18-bit word alignment. The R0 check at the receive logic permits the detection of word misalignment. R0 is calculated so as to assure at least one transition within within each 18-bit word. The worst case run length is 0x00001 followed by 0x30000, which limits the maximum run length to 33.

The CRC encoder logic 46 processes the received parallel data stream over signal lines TXC<15:0> for each respective channel and generates the R0 and R1 bits. The logic employed by the CRC Block Encoder 46 to generate the R0 and R1 bits for each channel are set forth below.

R0=!(TXC0+TXC1+TXC3+TXC4+TXC6+TXC7+TXC9+TXC10+TXC12+TXC13+TXC15);

R1=!(TXC0+TXC2+TXC3+TXC5+TXC6+TXC8+TXC9+TXC11+TXC12+TXC14+TXC15).

The "+" signs in the above equations indicate exclusive OR functions. The "!" symbol in the above logic equations indicates an inversion. The resultant word and skew alignment bits generated in the above-described manner are inverted both in the transmit path and the receive path in order to assure at least one transition over the serial link for each word transmitted to facilitate clock recovery within the receive logic. These equations can be implemented in 4 levels of 2-input XOR gates, which can operate at high speed

Skew/Control Encoder

The R1 bit generated in the above described manner is coupled to skew/control encoder logic 50. The skew/control encoder logic 50 encodes control information with the R1 bit in each channel and rotates the resultant bit across the channels such that the encoded version of the R1 bit is not transmitted in the same serial channel as the cipher data from which the resultant bit was derived. For example, if R1 is generated in the CRC encoder logic 46 of channel 1, after encoding with control information, the resultant bit in the illustrated embodiment is transmitted over serial channel 2.

Inter-channel skew can occur due to physical path differences as well as varying delay in the deserializer framing. It is therefore necessary to provide a mechanism to correct for such inter-channel skew at the receiver. To minimize overhead, the same bits that are employed to carry information employed to correct inter-channel skew also have encoded thereon control information corresponding to the idle and data valid information received over the TX_EN<1:0> lines. More specifically, there are 4 control states that have to be transmitted across the link (Idle, Data Valid All, Data Valid High, Data Valid Low) to allow byte-wide transmissions. The encoding provided by the skew/control encoder logic produces the TX<17> bit in each channel which is added to the transmit words The four control states are received from the SMII bus over the TX_EN<1:0> lines as shown in Table 9. These signals pass through equal pipeline delay logic 35 such that the control information can be reassociated with the respective data. The signals C<1:0> thus represent versions of the TX_EN<1:0> signals which are delayed appropriately by delay logic 35. The signals C<1:0> are coupled to the Skew/Control Encoder logic 50 as depicted in FIG. 3.

TABLE 9

| | Control State | |
|---|---|---|
| C1 (TX_EN1) | C0 (TX_EN0) | Control State |
| 0 | 0 | Idle |
| 0 | 1 | Data Valid Low |
| 1 | 0 | Data Valid High |
| 1 | 1 | Data Valid All |

In the four-channel implementation, the C1 and C0 control bits are encoded with the four R1 bits from each channel ($R_A1 \ldots R_D1$) to produce four control-encoded bits, K<3:0>, as shown below.

K3=$R_A$1+C1
K2=$R_B$1+C1
K1=$R_C$1+C0
K0=$R_D$1+C0

Thus, the K3 bit represents the exclusive OR of the R1 bit generated in Channel A with the C1 bit, the K2 bit represents the exclusive OR of the R1 bit generated in Channel B with the C1 bit, the K1 bit represents the exclusive OR of the R1 bit generated in Channel C with the C0 bit and the K0 bit represents the exclusive OR of the R1 bit generated in Channel D with the C0 bit. The code word K<3:0> generated in the above described manner carries the control state information received over signal lines TX_EN<1:0> and allows for the detection of any single-bit error in the R1 bits.

The Skew/Control Encoder logic 50 rotates the respective K bits to channels in which the R1 bits were not generated to provide a key which the receiver can use to detect and adjust for inter-channel skew. In the present implementation, the K<3:0> code bits are rotated by one bit across the four channels and attached to the data as the TX<17> bit in each channel, as shown in Table 10.

TABLE 10

| TX17 Control Encoding | |
|---|---|
| TX17 Control Bits | Encoding |
| TXa<17> | K0 = $R_D$1 + C0 |
| TXb<17> | K3 = $R_A$1 + C1 |
| TXc<17> | K2 = $R_B$1 + C1 |
| TXd<17> | K1 = $R_C$1 + C0 |

As illustrated by Table 10 and FIG. 3, the R1 bit generated in Channel D is encoded with the C0 bit to form the K0 bit which is forwarded over signal line TXa<17> to the TX Register 48 in Channel A for transmission over Channel A, the R1 bit generated in Channel A is encoded with the C1 bit to form the K3 bit which is forwarded over signal line TXb<17> to the TX Register 48 in Channel B for transmission over Channel B, the R1 bit generated in Channel B is encoded with the C1 bit to form the K2 bit which is forwarded over signal line TXc<17> to the TX Register 48 in Channel C for transmission over Channel C and the R1 bit generated in Channel C is encoded with the C0 bit to form the K1 bit which is forwarded over signal line TXd<17> to the TX Register 48 in Channel D for transmission over Channel D.

The receiver utilizes the TX<17> bits from the respective channels in combination to to acquire inter-channel sync. Additionally, the receiver uses the TX<17> bits received over the respective channels to extract the control information during normal operation as hereinafter described.

The TX Register 48 for Channel A drives the signal lines TXa<17:0>. The signal lines TXa<17:0> are derived from the output of the CRC encoder TXa<15:0>. The R0a bit is coupled through the TX Register 48 to form TXa<16> and the skew/control encoder logic 50 generates the K0 signal which is coupled to the bus TXa<17:0> via the TX Register 48.

The signal lines TX<17:0> at the output of the TX Register 48 for each of the four channels are coupled to the input to the Serializer/Deserializer logic 24a–26d. A differential transmit clock TX_CLK+, TL_CLK−, also driven by the physical coding sublayer 18, is also included within the SERDES bus 22 for each channel. A serializer within the SERDES logic for each channel receives as an input the 18 bit parallel encoded data and serializes the data to form a serialized bit stream. The serialized bit stream is transmitted from the respective serializers (24a–24d) over the respective communication links or channels 26a–26d. In the illustrated embodiment, the serial links comprise differential signals to the driver logic 28.

The serialized data are transmitted over the serial link over signal lines TXD+/− and are received at inputs RXD+/− from receive logic 28 which adapts the serial signals to the applicable transmission medium. The receive data is converted by the deserializer from serial form to an 18 bit parallel data word within deserializer logic 24 and transmitted over the receive portion of the SERDES bus 22 to the physical coding sublayer 18. The parallel data is then processed within the receive path of the physical coding sublayer as discussed below to obtain word and skew alignment.

Receive Path

Figure 5:
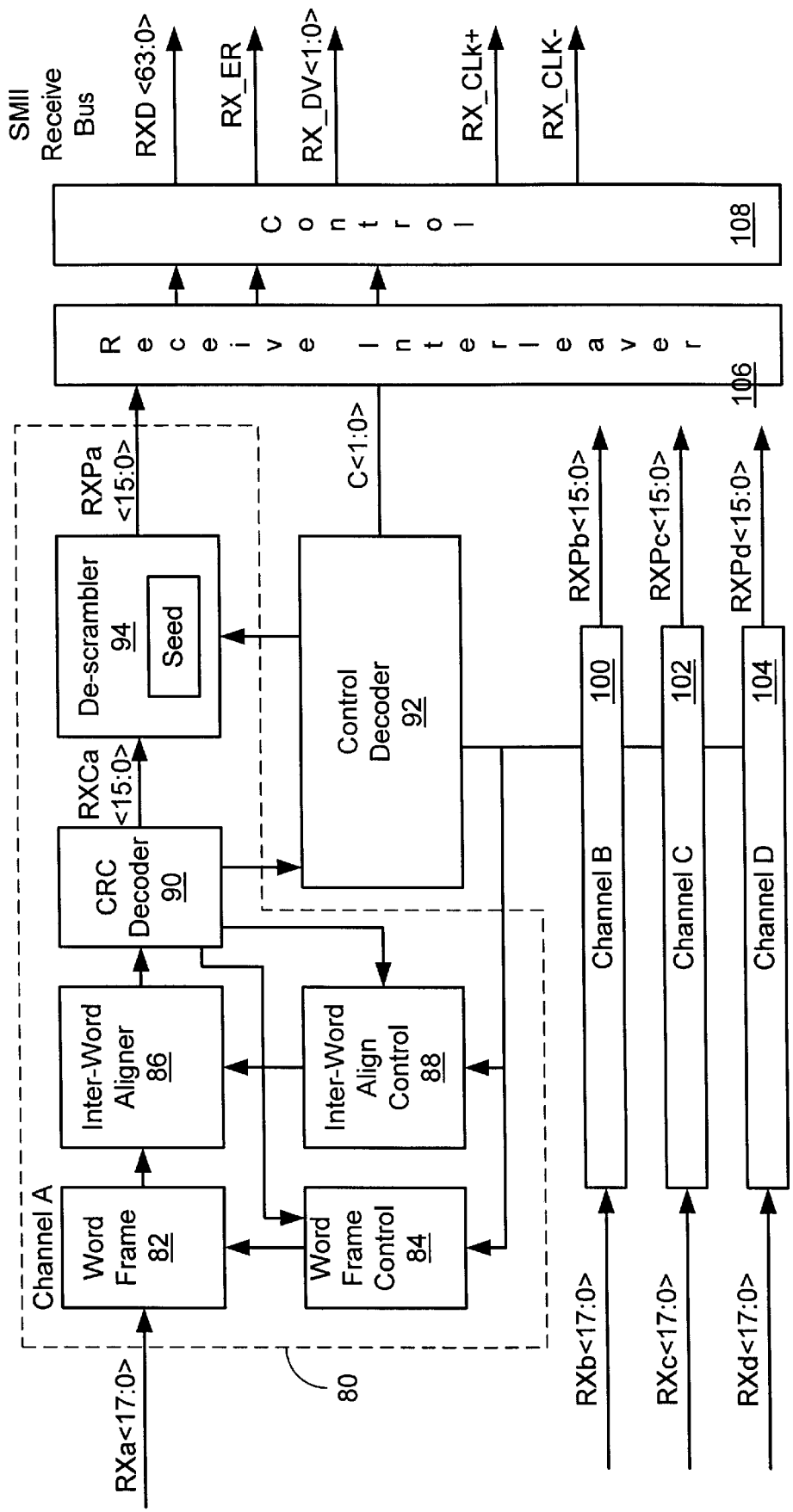
FIG. 5 is a block diagram illustrating the receive logic associated with the physical coding sublayer depicted in FIGS. 1 and 2.

The receive path through the physical coding sublayer 18 is depicted with greater particularity in FIG. 5. The receive path roughly follows the transmit path in reverse with the added complexity needed to obtain word alignment within each channel and skew alignment among the channels, and to obtain seed synchronization for the descrambler.

Word and skew alignment is performed in a number of steps. As the initial step in acquiring synchronization of received data, word-frame alignment within each channel is achieved using the R0 bits. The channels are then de-skewed using the received K bits and calculated R1 bits. The scrambler states are then acquired during an Idle transmission. The Bit Error Rate during acquisition is assumed to be reasonably good such that there is a high probability that correlation calculations done over 128 words will not experience an error.

Although the receive channel logic 80 is depicted and described specifically for Channel A, is should be appreciated that similar receive channel logic, though not shown for ease of illustration, is provided for each of the other receive channels.

Receiver Word Frame Alignment

Figure 6:
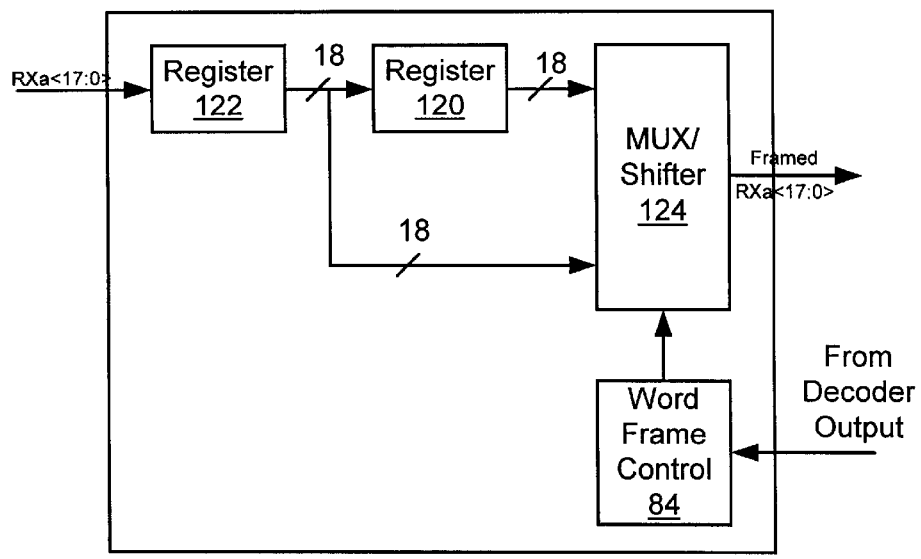
FIG. 6 is a block diagram illustrating word framing logic.

The apparatus and techniques for performing word framing are illustrated in FIGS. 5 and 6. Word framing within each channel, is acquired by checking the calculated or estimated $\hat{R}0$ bit out of the CRC Decoder 90 against the transmitted R0 bit (RX<16>). The Word Frame Control machine 84 in each channel shifts the framing until acquisition in each channel is achieved. The R0 bit is derived from the scrambled data which can be considered to have a random distribution. The Word Frame Control correlates (XORs) the transmitted value against the calculated value for a predetermined number of samples to declare alignment with a low probability of false detection. More specifically, alignment may be declared if a predetermined number of matches are detected over a predetermined number of word samples.

$$\sum_{n=1}^{N} \hat{R}0_n + R0_n = 0$$

Where $\hat{R}0$ is the estimated value of R0 generated from the receiver CRC Decoder. The probability of false alignment is 3E-39 if the calculation is done over 128 words (N=128) and the scrambled data is random.

The received data for each channel when presented to the physical coding sublayer 18 is framed randomly by the de-serializer logic 24. One technique for performing word framing is depicted with greater particularity in FIG. 6. The received word which is delayed in a register 120 to produce a delayed word and fed into a multiplexer 124 along with the current received word held in register 122. The multiplexer thus has access to 36 contiguous bits of the serial stream and can re-frame across the arbitrary word boundary presented at the physical coding sublayer 18 input. The word frame control machine 84 uses the CRC Decoder 90 outputs to search through the 18 possible framing options until the estimated correct frame location is acquired. This framing is thus verified over a predetermined number of word samples.

Receiver Inter-channel Alignment

Once word framing is achieved in all channels the bits are assumed to be correct into the Control Decoder 92 and Inter-Channel alignment can proceed. There are several methods of proceeding but the approach outlined below aligns channels A, B and C before aligning D. In a similar process to that used in word framing, correlation of the bits to the data can be checked and any control data discarded.

$$\sum_{n=1}^{N} \hat{R}1a_n + \hat{R}1b_n + K2_n + K3_n = 0$$

$$\sum_{n=1}^{N} \hat{R}1a_n + \hat{R}1b_n + R1b_n + C1_n + R1a_n + C1_n = 0$$

$$\sum_{n=1}^{N} (\hat{R}1a_n + \hat{R}1a_n) + (\hat{R}1b_n + R1b_n) = 0$$

Where $\hat{R}1a$ and $\hat{R}1b$ are the estimated or calculated values of R1a and R1b generated from the CRC Decoders in channels A and B respectively. K2 and K3 are the encoded bit generated by the skew/control encoder 50 and transmitted in channels C and B respectively.

Inter-channel skew between A, B and C can be adjusted until the correct correlation occurs. Inter-channel skew among channels A, B and C is adjusted until the correct correlation occurs. Inter-Channel skew for the three channels is verified over a number of samples to verify to a high probability that the words in the three Channels are properly aligned. In the event the Inter-Word align control state machine 88 determines that the words in the three channels are not aligned, word framing on one of the channels is adjusted backward or forward by one word in successive steps according to a prespecified method until proper word alignment across the channels is obtained. The interchannel word alignment may be adjusted by inter-word Align Control Logic 88 in any suitable manner until proper alignment across the three channels is obtained. One exemplary approach in Table 11 below.

TABLE 11

| Channel | Step | 0 | 1 | 2 | 3 | 4 | 5 | 6 | 7 | 8 |
|---|---|---|---|---|---|---|---|---|---|---|
| A | | 0 | 0 | 0 | 0 | 0 | 0 | 0 | 0 | 0 |
| B | | 0 | −1 | +1 | 0 | 0 | −1 | −1 | +1 | +1 |
| C | | 0 | 0 | 0 | −1 | +1 | −1 | +1 | −1 | +1 |

While the above table illustrates steps within channel B and C for −1 word and +1 word skew adjustments, the table may be extended to −2 and +2 word skew adjustments or as far as necessary to assure that any possible skew adjustments can be accommodated within a given system.

After obtaining alignment of channels A, B and C in the above described manner, a similar calculation can be performed by the inter word align controller 88 to assure that channel D is properly aligned with channels A, B and C. The logic necessary to perform such verification is illustrated by the following logic equations.

$$\sum_{n=1}^{N} \hat{R}1c_n + \hat{R}1d_n + K0_n + K1_n = 0$$

$$\sum_{n=1}^{N} \hat{R}1c_n + \hat{R}1d_n + R1c_n + C0_n + R1d_n + C0_n = 0$$

$$\sum_{n=1}^{N} \left(\hat{R}1c_n + R1c_n\right) + \left(\hat{R}1d_n + R1d_n\right) = 0$$

In particular, the calculated R1 bit for Channel C is exclusive ORed with the calculated R1 bit for channel D, the K0 bit transmitted over Channel A and the K1 bit transmitted over Channel D over N words. As illustrated by the logic equations above, when channel D is properly aligned with Channels A, B, and D the value of the above identified exclusive OR operation will be 0. By repeating the verification over a predetermined number of sample words, alignment of channels A, C and D can be assured to an extremely high probability.

In the event the test of Channel D alignment reveals that it is not aligned with the other two channels included in the exclusive OR operation, the word alignment of Channel D is adjusted and the verification test is repeated until alignment is achieved. For example, if the initial verification D for Channel D alignment reveals that it is not aligned, the word alignment on Channel D may be adjusted backwards by one word (−1 word). If the verification test for alignment on Channel D again reveals no alignment, the alignment of Channel D may be adjusted forward 1 word from its initial framing alignment and the verification test repeated. This adjustment process may be repeated until proper skew alignment for channel D is achieved.

Figure 7:
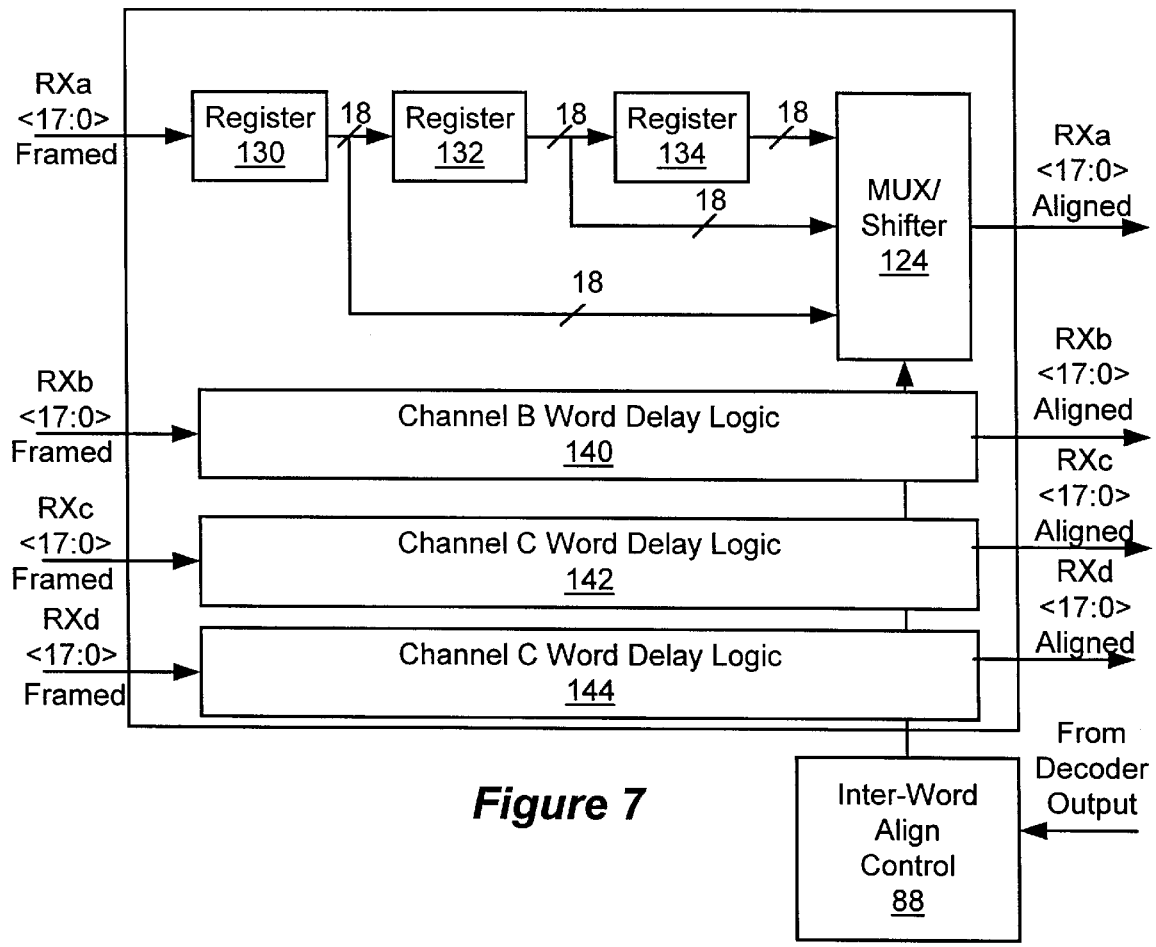
FIG. 7 is a block diagram illustrating skew alignment logic.

FIG. 7 shows an exemplary implementation to achieve interchannel skew alignment. Each channel contains a cascade of three delay registers 130, 132, 134 which progressively delay the receive words. The number of delay stages required is a function of the possible skew that could occur during transmission through the channel and is system specific. The implementation in FIG. 7 allows for an inter-channel skew of +/−1 word. A multiplexer 136 in each channel can select the appropriate delayed word as the output and the Inter-Channel Alignment Control 88 adjusts the delays until the K bits are received correctly according to the equations above.

Receiver Scrambler Acquisition

Once word and skew alignment is achieved, the receiver can detect when an Idle symbol is being transmitted. The Idle state is defined to be 0x5555555555555555 on the SMII which appears as 0xFF in channels A and C and 0x00 in channels B and D after interleaving. The Idle is then scrambled in each channel. The scrambler seed can be recovered in each channel by XORing the received cipher text, RXC<15:0>, with either 0x00 or 0xFF in the appropriate channel. The pseudo random sequence state can be completely recovered in one Idle period because the sequence length is 15 and the complete state is defined in each channel's 16-bit data word.

Receiver Error Detection

Once the receiver has acquired complete lock (as described in the above described acquisition process) with a high degree of certainty, the receiver can recover the data and control and use the R0 and K bits for error detection. State machines can keep track of the error rate in the receiver and make a determination of when re-acquisition is required. The high data rates and continuous monitoring of alignment on each symbol make error detection and re-acquisition very fast and blind to the transmitter.

The Receive Interleaver

The outputs from the four channels RXPa<15:0>, RXPb<15:0>, RXPc<15:0>, RXPd<15:0> are coupled to the receive interleave logic 106 which recombines the data to service the SMII receive bus. The data from the four channels are combined by the receive interleave logic 106 as indicated below to form the original 64 bit word.

RXD<63:0>=<RXPd15, RXPc15, RXPb15, RXPa15, RXPd14, RXPc14, RXPb14, RXPa14, RXPd13, RXPc13, RXPb13, RXPa13, RXPd12, RXPc12, RXPb12, RXPa12, RXPd11, RXPc11, RXPb11, RXPa11, RXPd10, RXPc10, RXPb10, RXPa10, RXPd9, RXPc9, RXPb9, RXPa9, RXPd8, RXPc8, RXPb8, RXPa8, RXPd7, RXPc7, RXPb7, RXPa7, RXPd6, RXPc6, RXPb6, RXPa6, RXPd5, RXPc5, RXPb5, RXPa5, RXPd4, RXPc4, RXPb4, RXPa4, RXPd3, RXPc3, RXPb3, RXPa3, RXPd2, RXPc2, RXPb2, RXPa2, RXPd1, RXPc1, RXPb1, RXPa1, RXPd0, RXPc0, RXPb0, RXPa0>

The 64 bit data word, the control signals originally received over the TX_EN<1:0> lines and an indication of an error condition, if any has been detected in the course of transmission over the physical coding sublayer, is forwarded by the interleave logic 106 to the receive control logic 108.

The above described physical coding sublayer 18 may be fabricated as a single integrated circuit to minimize the circuit board real estate dedicated to the presently described data transmission and distribution functions. Moreover, the SERDES logic may also be integrated with the physical coding sublayer logic so that all common logic normally associated with the physical coding sublayer system is integrated in a single device. Given such integration, off chip logic would needed to interface the device to the specific media employed for the multiple serial channels and logic necessary to interface the wide parallel interface to reconciliation logic necessary to interface the device to MAC circuitry or any other desired system interface.

It should be noted that the scrambler logic may be omitted in the event decorrelation of the transmitted data is not required. Additionally, it should be noted that in another embodiment the control values represented by the C bits need not be encoded on the R1 bits. In such event the skew alignment bit transmitted over the serial channel comprises the R1 bits rather than control encoded versions of such bits. The transmission of the R1 bits as the skew alignment bits simplifies the skew alignment process and allows alignment to proceed two channels at a time rather than three at a time as described above. Additionally, CRC encoding and decoding logic may be reduced by generating a single CRC code for using the single code for generation of both the word framing and skew alignment.

Finally, it will be understood by those of ordinary skill in the art that modifications to and variations of the above described methods and apparatus may be made without departing from the inventive concepts disclosed herein. Accordingly, the invention should not be viewed as limited except as by the scope and spirit of the appended claims.

What is claimed is:

1. In a multi-channel data transmission system including segmentation circuitry for dividing a wide parallel data word into a plurality of lesser width parallel data words, and serializers for converting said lesser width parallel data words into serial data streams for transmission over respective serial channels, a method for transmitting information, said method comprising:

obtaining a first data word, at least in part, from each of said lesser width parallel data words;

generating a first crc code from each of said first data words;

exclusive ORing two of said first crc codes with a first control bit to form a first pair of crc output codes and exclusive ORing another two of said first crc codes with a second control bit to form a second pair of crc output codes;

associating each one of said crc output codes with a different one of said first data words to form a plurality of extended width information words, such that each crc output code is associated with an extended width information word containing a first data word other than the first data word from which the respective crc output code was derived; and transmitting said extended width information words over a corresponding plurality of serial channels.

2. The method of claim 1 further comprising the step of scrambling each one of said lesser width parallel data words in a first predetermined manner to form said first data words.

3. The method of claim 2 wherein said scrambling step comprises the step of exclusive ORing each lesser width data word with the output of a pseudo random binary sequence generator.

4. The method of claim 3 wherein said pseudo random binary sequence generators are operative to generate the same pseudo random binary sequence.

5. The method of claim 4 wherein said pseudo random binary sequence generators include a seed register for initiating the respective generator and said method further includes the step of loading each of said seed registers with a different seed value to decorrelate the outputs of the respective pseudo random binary sequence generators locally in time.

6. The method of claim 5 wherein said pseudo-random binary sequence generators are operative to generate the binary sequence defined by the following polynomial:

$$G_P(x)=1+x^{14}+x^{15}$$

7. The method of claim 5 wherein said pseudo-random binary sequence generators are operative to generate the binary sequence defined by the following polynomial:

$$G_S(x)=1+x^{11}+x^{15}$$

8. The method of claim 1 further comprising the step of generating a word framing crc code from each of said first data words and associating the respective word framing crc code with the first data word from which it was derived as a part of the respective extended width information word.

9. The method of claim 8 wherein said step of generating said word framing crc code comprises the step of exclusive ORing bits 0, 1, 3, 4, 6, 7, 9, 10, 12, 13 and 15 of the respective intermediate data word to generate the respective crc code, where bit 0 comprises the lower order bit of said first data word.

10. The method of claim 8 wherein said step of generating a word framing crc code further includes the step of generating said word framing crc code to assure that at least one data transition occurs within each one of said extended width information words.

11. The method of claim 10 wherein said step of generating said word framing crc code further includes the step of exclusive ORing predetermined bits of said intermediate data word to generate a resultant code and inverting the resultant code to obtain said word framing crc code.

12. The method of claim 11 wherein said transmitted extended width information words have a maximum run length of 33 bits.

13. The method of claim 1 wherein said serial channels comprise electrically conductive paths.

14. The method of claim 1 wherein said serial channels comprise logical channels within at least one optical fiber.

15. The method of claim 1 comprising the steps of:

receiving said serialized extended width data words over respective serial channels;

converting said received serialized extended width data words to received extended width parallel data words;

utilizing said crc output codes received over said plurality of channels to obtain skew alignment across the respective channels.

16. The method of claim 15 further comprising the step of decoding said received crc output codes to obtain said first and second control bits.

17. The method of claim 16 further comprising the step of determining whether the respective wide parallel data word contains an idle character, all valid data bytes, valid low order data bytes or valid high order data bytes based upon the contents of said first and second control bits.

18. The method of claim 15 further comprising the step of:

deriving calculated crc codes from said first data words contained within said received extended width parallel data words;

comparing said calculated crc codes to decoded crc codes derived from said received crc codes and providing an indication of an error condition in the event at least one of said calculated crc codes does not match a selected one of said derived crc codes.

19. The method of claim 1 wherein each one of said lesser width data words and the corresponding first data word are the same data word.

20. The method of claim 1 wherein said generating step comprises the step of exclusive ORing predetermined bits of the respective first data word to generate the respective first crc code.

21. The method of claim 1 wherein said step of generating said first crc code comprises the step of exclusive ORing bits 0, 2, 3, 5, 6, 8, 9, 11, 12, 14 and 15 of the respective first data word to generate the respective crc code, where bit 0 comprises the lower order bit of said first data word.

22. A multi-channel data transmission system comprising:
   segregation logic for dividing a wide parallel data word into a plurality of lesser width parallel data words;
   scrambler logic operative to scramble each of said lesser width parallel data words in a first predetermined manner to provide a corresponding plurality of scrambled data words;
   crc generator logic operative to generate first and second crc codes from each of said scrambled data words and to associate said first crc codes with the respective scrambled data word from which the first crc codes were derived to form a plurality of extended width information words corresponding in number to the number of scrambled data words;
   encoding logic operative to exclusive OR a first control bit with two of said second crc codes to form a first pair of control encoded crc codes, to exclusive OR a second control bit with two other ones of said second crc codes to form a second pair of control encoded crc codes, and to couple each one of said encoded crc codes to an extended width information word containing a scrambled data word other than the scrambled data word from which the respective control encoded crc code was derived;
   a plurality of serial channels;
   a plurality of serializers for converting said extended width information words into serialized extended width information words for transmission over corresponding ones of said serial channels;
   a plurality of deserializers for receiving said serialized extended width information words and for converting said serialized words into received extended width information words;
   word synchronization logic associated with each of said channels, said word synchronization logic operative to utilize the respective first crc code to determine whether proper word framing has been acquired and to provide an indication of word alignment; and
   skew alignment logic operative in response to said indication of word alignment, at least two of said control encoded crc codes and at least two calculated crc codes derived from a selected pair of scrambled data words contained within the corresponding received extended width information words, to determine, over a plurality of scrambled data words, whether said scrambled data words are skew aligned, and to provide an indication of skew alignment.

23. The multi-channel data transmission system of claim 22 further comprising:
   decode logic operative in response to said indication of skew alignment to derive received first and second control bits from selected ones of said first and second encoded crc bits, which received first and second control bits correspond to said first and second control bits respectively.

24. The multi-channel data transmission system of claim 23 wherein said decode logic Is operative to provide an indication that the respective scrambled data words correspond to an idle word in response to a predetermined combination of said received first and second control bits.

25. The multi-channel data transmission system of claim 24 further comprising:
   a plurality of descramblers corresponding in number to said plurality of scrambled data words; and
   seed generation logic operative in response to said indication of said idle word to exclusive OR a predetermined idle value with each of said received scrambled data words to obtain a corresponding plurality of descrambler seed values.

26. The multi-channel data transmission system of claim 24 wherein said descramblers are operative in response to the loading of the respective descrambler seed values to commence descrambling of received scrambled data words to recover said plurality of lesser width parallel data words.

27. The multi-channel data transmission system of claim 26 further comprising aggregation circuitry operative to combine said lesser width parallel data words to recover said wide parallel data word.

28. The multi-channel data transmission system of claim 22 further comprising:
   first crc code generation logic for deriving first calculated crc codes from said scrambled data words contained within said received extended width parallel data words; and
   first comparison logic for comparing said first calculated crc codes to the respective first crc codes contained the the received extended width information word from which the first calculated crc codes were derived and providing an error indication in the event at least one of said first calculated crc codes does not match the respective first crc code contained with the respective extended width information word.

29. The multi-channel data transmission system of claim 22 further comprising:
   second crc code generation logic for deriving second calculated crc codes from said scrambled data words contained within said received extended width parallel data words;
   decoding logic for generating decoded crc codes from said encoded crc codes contained within respective extended width information words; and
   second comparison logic for comparing each one of said second calculated crc codes to a selected one of said decoded crc codes and providing an error indication in the event at least one of said second calculated crc codes does not match the respective decoded crc code.

30. A method for achieving synchronization in a multi-channel data transmission system comprising:
   for each of a plurality of sequentially received first parallel data words:
      dividing the first parallel data word into a plurality of lesser width parallel data words, each of said plurality of lesser width parallel data words including a plurality of bits;
      scrambling the bits within each of said plurality of lesser width parallel data words in a predetermined manner to obtain a corresponding plurality of cipher data words;
      generating a plurality of word framing indicators, each word framing indicator being generated as a first predetermined function of one of said cipher data words;

appending said word framing indicator to the respective cipher data word from which the word framing indicator was generated to form an extended width information word;

generating a plurality of skew alignment indicators corresponding in number to the number of lesser width parallel data words, each one of said skew alignment indicators being generated as a second predetermined function of at least some of the contents of a respective one of said cipher data words;

appending each skew alignment indicator to one of said extended width information words other than the extended with information word containing the cipher data word from which the respective skew alignment indicator was generated;

serializing each one of said extended width information words and transmitting the serialized extended width information words over a corresponding plurality of serial channels;

receiving said serialized extended width information words from said plurality of serial channels;

deserializing said serialized extended width information words to obtain said plurality of extended width information words;

calculating a word framing indicator as said first predetermined function of said cipher data word contained within the respective extended width information word for each extended width information word;

comparing the respective calculated word framing indicator to the word framing indicator transmitted with the respective extended width information word and providing an indication of a word alignment match in the event said calculated word framing indicator matches said transmitted word framing indicator; and providing an indication that proper word synchronization has been obtained for each respective channel in the event a predetermined number of matches between said calculated and transmitted word framing indicators over a predetermined number of extended width information words.

31. The method of claim 30 further comprising the steps of:

in the event a predetermined number of matches are not detected following said repeating step, shifting the bit framing of the respective serialized extended width information word and re-initiating said repeating and comparing steps until said indication of proper word framing is provided.

32. The method of claim 31 wherein said second predetermined function comprises exclusive ORing predetermined bits of the respective cipher data word to generate an intermediate value employed to generate said skew alignment indicator.

33. The method of claim 31 wherein in response to an indication of proper word framing for the serialized extended width information words received in all channels, said method further comprises the steps of:

in a skew alignment calculation step, calculating a skew alignment indicator from the cipher data word contained within each received extended width information word;

in a skew alignment comparison step, comparing the calculated skew alignment indicator with the corresponding skew alignment indicator transmitted in the serialized extended width information word in another predetermined one of said channels and providing an indication of proper skew alignment between channels in the event of a match between the calculated skew alignment indicator and the transmitted skew alignment indicator;

in a skew alignment repeating step, repeating said skew alignment calculating and comparison steps over a predetermined number of received extended width information words and providing an indication of proper skew alignment between the respective channels in the event a predetermined number of matches are detected.

34. The method of claim 33 further including the step of:

shifting the word framing by one word in one of said channels for which skew alignment was not detected and repeating said skew alignment calculation, comparison and repeating steps.

35. The method of claim 34 further including the step of:

repeating said skew alignment calculation, comparison, repeating and shifting steps for channels within a selected group of channels until such channel are skew aligned.

36. The method of claim 30 wherein said first predetermined function comprises exclusive ORing predetermined bits of the respective cipher data word to generate said word framing indicator.

37. The method of claim 30 wherein said second predetermined function comprises exclusive ORing predetermined bits of the respective cipher data word to generate said skew alignment indicator.

38. A method for achieving synchronization in a multi-channel data transmission system comprising:

for each of a plurality of ordered first parallel data words:

dividing the respective first parallel data word into a plurality of lesser width parallel data words, each of said plurality of lesser width parallel data words including a plurality of bits;

scrambling the bits within each of said plurality of lesser width parallel data words in a predetermined manner to obtain a corresponding plurality of cipher data words;

generating a plurality of word framing indicators, each word framing indicator being generated as a first predetermined function of one of said cipher data words;

appending said word framing indicator to the respective cipher data word from which the word framing indicator was generated to form an extended width information word;

for each cipher data word, in a second predetermined function, exclusive ORing at least some of said bits of the respective cipher data word to form respective skew alignment values;

generating a plurality of skew alignment indicators, wherein each one of said skew alignment indicators is generated as an exclusive OR of the respective skew alignment value with a selected bit of a multibit control value and wherein each control bit of said multibit control value is exclusive ORed with two skew alignment values to form two corresponding skew alignment indicators;

including each skew alignment indicator in one of said extended width information words other than the extended width information word containing the cipher data word from which the respective skew alignment indicator was generated, serializing each one of said extended width information words and transmitting the serialized extended width information words over a corresponding plurality of serial channels;

receiving said serialized extended width information words from said plurality of serial channels;

deserializing said serialized extended width information words to obtain said plurality of extended width information words;

calculating a word framing indicator as said first predetermined function of said cipher data word contained within the respective extended width information word for each extended width information word;

comparing the calculated word framing indicator to the word framing indicator transmitted with the respective extended width information word and providing an indication of a word alignment match in the event said calculated word framing indicator matches said transmitted word framing indicator; and providing an indication that proper word synchronization has been obtained for each respective channel in the event a predetermined number of matches between said estimated and calculated word framing indicators over a predetermined number of extended width information words.

39. The method of claim 38 further including the steps of:
in the event of an indication that proper word synchronization has been obtained:
  in a first skew test step, exclusive ORing the skew alignment indicators transmitted through two selected channels with two skew alignment values from two cipher data words transmitted through two other selected channels, where said two skew alignment indicators and said two cipher data words from which said skew alignment value are calculated are transmitted collectively over a first three of said serial channels;
  providing an indication of a skew match across said three channels in the event the result of said first skew test step equals C; and
  providing an indication of skew alignment in the event a predetermined number of skew matches are detected over a predetermined number of received serialized extended width information words.

40. The method of claim 39 further comprising the step of providing an indication of skew misalignment in the event that a predetermined number of skew matches are not detected within a predetermined number of sequentially received serialized extended width information words.

41. The method of claim 40 further comprising the steps of:
  in the event of the detection of an indication of skew misalignment;
    shifting word alignment of one serialized extended width information word in one of said first three channels in accordance with a predetermined shifting methodology; and
    repeating the steps set forth in claim 40 and said shifting step until an indication of skew alignment across said first three channels is obtained.

42. The method of claim 41 further comprising the steps of:
  in a second skew test step, exclusive ORing another two of said skew alignment Indicators transmitted through two channels other than said channels through which said skew alignment indicators referenced in said first skew test step were transmitted with two skew alignment values calculated in accordance with said second predetermined function from two cipher data words transmitted through two other selected channels, where said two skew alignment indicators and said two cipher data words from which said skew alignment intermediate value are calculated are transmitted collectively over a second three of said serial channels;
  providing an indication of a skew match across said three channels in the event the result of said second skew test step equals 0; and
  providing an indication of skew alignment in the event a predetermined number of skew matches are detected over a predetermined number of received serialized extended width information words.

43. A method for achieving synchronization in a multi-channel data transmission system comprising:
  for each of a plurality of ordered parallel data words:
    dividing the respective parallel data word into a plurality of lesser width parallel data words, each of said plurality of lesser width parallel data words including a plurality of bits;
    scrambling the bits within each of said plurality of lesser width parallel data words in a predetermined manner to obtain a corresponding plurality of cipher data words;
    generating a plurality of word framing indicators, each word framing indicator being generated as a first predetermined function of one of said cipher data words;
    appending said word framing indicator to the respective cipher data word from which the word framing indicator was generated to form an extended width information word;
    generating a plurality of skew alignment values, wherein each of said skew alignment values is generated by a second predetermined function comprising an exclusive OR of at least some of said bits of the respective cipher data word,
    generating a plurality of skew alignment indicators, wherein each one of said skew alignment indicators is generated as an exclusive OR of the respective skew alignment value with a selected bit of a multibit control value and wherein each control bit of said multibit control value is exclusive ORed with two skew alignment values to form two corresponding skew alignment indicators;
    appending each skew alignment indicator to one of said extended width information words other than the extended with information word containing the cipher data word from which the respective skew alignment indicator was generated;
    serializing each one of said extended width information words and transmitting the serialized extended width information words over a corresponding plurality of serial channels;
    receiving said serialized extended width information words from said plurality of serial channels;
    deserializing said serialized extended width information words to obtain said pluralities of extended width information words;
    utilizing said word framing indicators to identify if the respective extended width information words are not properly synchronized on word boundaries; and
    utilizing said skew alignment indicators to identify whether the extended width information words received over said plurality of serial channels are properly aligned across the respective channels.

* * * * *